United States Patent [19]

Fukui

[11] 4,266,787
[45] May 12, 1981

[54] PISTON RING

[75] Inventor: Takeo Fukui, Tokyo, Japan

[73] Assignee: Honda Giken Kogyo Kabushiki Kaisha, Tokyo, Japan

[21] Appl. No.: 115,958

[22] Filed: Jan. 28, 1980

[30] Foreign Application Priority Data

Feb. 2, 1979 [JP] Japan ............................ 54-11529[U]

[51] Int. Cl.³ .............................................. F16J 15/9
[52] U.S. Cl. .................................. 277/160; 277/217
[58] Field of Search .................. 92/177, 233; 277/160, 277/138, 217

[56] References Cited

U.S. PATENT DOCUMENTS

| | | | |
|---|---|---|---|
| 1,436,177 | 11/1922 | Krause | 92/177 |
| 2,766,749 | 9/1956 | Marien | 277/160 |
| 2,983,256 | 5/1961 | Seeloff | 92/177 |
| 4,198,065 | 4/1980 | Fukui | 277/217 |

FOREIGN PATENT DOCUMENTS

2925779  6/1978  Fed. Rep. of Germany ........... 277/217

*Primary Examiner*—Robert I. Smith
*Attorney, Agent, or Firm*—Lyon & Lyon

[57] ABSTRACT

A piston ring for an oblong piston is adapted to be received in a peripheral groove on the piston. The piston ring is split and the gap between the split ends is located at the center of one of two spaced curved sections of said piston ring. A corrugated spring is received in the peripheral groove within the piston ring and a gap between its split ends is positioned adjacent a side section which extends between the spaced curved sections. The corrugations which contact the side section are closer together than those which contact the curved end sections of the piston ring. This construction helps to equalize the pressure of the piston ring against the cylinder at points around the outer surface of the piston ring.

4 Claims, 2 Drawing Figures

PISTON RING

This invention relates to piston rings of the type employed on pistons of internal combustion engines. It is particularly directed to improvements in piston rings for use with oblong pistons. An oblong piston mounted to reciprocate within an oblong cylinder is shown in the copending application of Takeo Fukui, Ser. No. 22,802, filed Mar. 22, 1979, now U.S. Pat. No. 4,198,065 granted Apr. 15, 1980. In cross section the piston and cylinder are longer in one direction than the other and have spaced curved end portions connected by side portions which may be straight or arched. The curved end portions may comprise parts of a circle, or the overall cross section shape may be elliptical.

One or more peripheral grooves in the piston each receives a split oblong piston ring together with a corrugated spring in the groove acting on the inner surface of the piston ring.

It is highly desirable to maintain the pressure between the piston ring and the cylinder as uniform as possible around the periphery of the oblong piston ring. In this way, sealing efficiency is obtained in the sliding contact between the piston ring and the cylinder.

In accordance with this invention, the oblong piston ring has spaced curved end sections connected by side sections, and the piston ring is split at the center of one of the curved end sections. A corrugated spring is received within the peripheral groove behind the piston ring and acts against the inner surface of the piston ring to urge it toward sealing contact with the cylinder. The corrugated spring has a gap adjacent one of the side sections of the piston ring. The corrugations are closer together near the side sections than they are near the curved end sections. The result is that pressure between the oblong piston ring and the oblong cylinder is made more uniform at locations around the periphery of the piston ring.

Other and more detailed objects and advantages will appear hereinafter.

Figure 1:
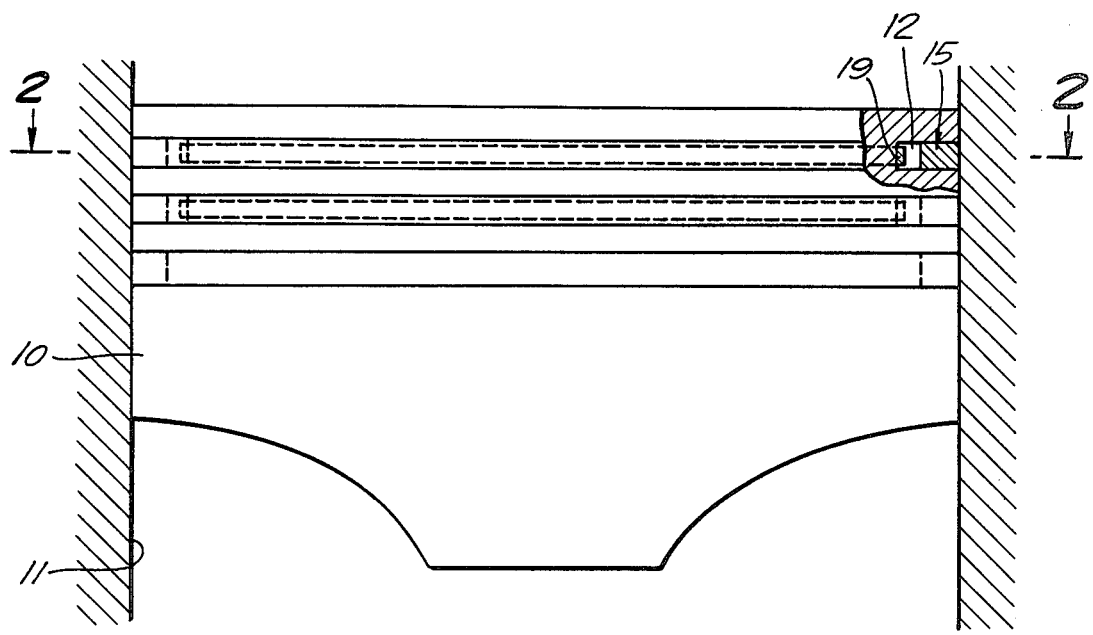
FIG. 1 is a side elevation partly in cross section, showing a preferred embodiment of this invention.
Figure 2:
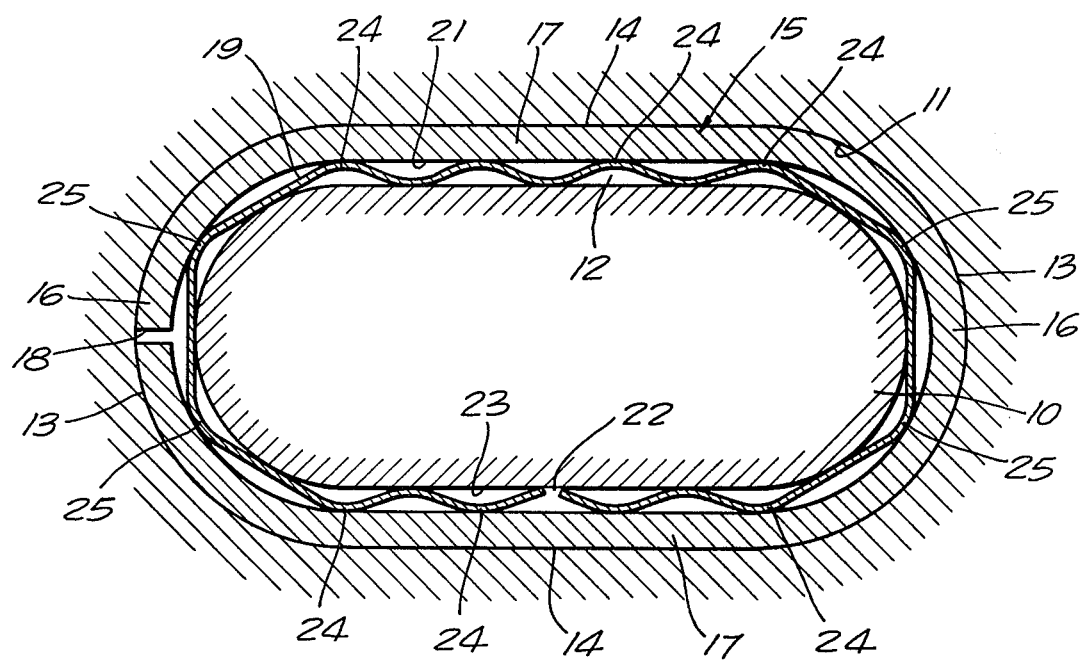
FIG. 2 is a sectional plan view taken substantially on the lines 2—2 as shown in FIG. 1.

Referring to the drawings, the piston 10 is mounted to reciprocate within a cylinder 11 and is provided with peripheral grooves 12. The cooperating sliding surfaces of the piston and cylinder are not cylindrical. Instead, the piston 10 and cylinder 11 are elongated in a direction parallel to the rotary axis of the crank shaft (not shown). Each cylinder 11 is oblong, that is, having a greater dimension in one direction than in another direction at right angles thereto. The cylinder 11 has curved end portions 13 which preferably constitute a part of a circle in cross section. These curved end portions are joined by side surfaces 14 which are preferably in the form of parallel planes. However, the side surfaces may be arched to increase the lateral dimensions of the cylinder, or the cross section of the cylinder may be in the form of an elipse. It is intended that the term "oblong" cover any of these shapes. Each cylinder 11 is symmetrical about a plane passing through the longest of the cylinder cross sections.

A split piston ring 15 is mounted in the peripheral groove 12 and has curved end sections 16 joined by side sections 17. The outer surfaces of the piston ring sections have sliding contact with the cylinder 11. A gap 18 is located at the center of one of the curved sections 16.

Also received in the peripheral groove 12 is a corrugated spring 19 which contacts the inner surfaces 21 of the piston ring 16. This corrugated spring has a gap 22 adjacent the center of one of the straight wall sections 17 of the piston ring 15. The adjacent ends of the corrugated spring defining the gap 22 dig into the inner wall surface 23 of the peripheral groove 12 to anchor the corrugated spring 19 against unwanted movement. The four corrugations 24 which contact the side wall sections 17 and the joinder regions between the side wall sections 17 and the curved end sections 15 are closer together than the four corrugations 25 which contact the curved end sections 16. The result is that the pressure between the piston ring and the cylinder along the peripheral length of the piston ring is made more uniform, and the sealing efficiency is improved.

Having fully described my invention, it is to be understood that I am not to be limited to the details herein set forth, but that my invention is of the full scope of the appended claims.

I claim:

1. For use in an internal combustion engine having an oblong piston mounted to reciprocate within an oblong cylinder, the piston and cylinder having spaced curved end portions joined by side portions, and the piston having a peripheral groove, the improvement comprising: a split piston ring adapted to be received in the peripheral groove and having curved end sections adjoined by side sections, said sections having an outer surface for sliding contact with the cylinder, said piston ring being oblong and having a gap at the center of one of its curved end sections, a corrugated spring adapted to be received in the peripheral groove and having corrugations contacting the side sections and curved end sections of said piston ring, said corrugations being closer together near said side sections than near said curved end sections.

2. The device set forth in claim 1 in which the wider spaced corrugations near said curved end sections each have four contact points, two of which contact a curved end section of said piston ring and the other two each contact a joinder region between a side section and a curved end section.

3. For use in an internal combustion engine having an oblong piston mounted to reciprocate within an oblong cylinder, the piston and cylinder having spaced arcuate end portions joined by parallel side walls, and the piston having a peripheral groove, the improvement comprising: a split piston ring adapted to be received in the peripheral groove and having arcuate end sections joined by parallel wall sections, said piston ring being oblong and having an outer surface shaped for sliding contact with the oblong cylinder, said piston ring having a gap at the center of one of its arcuate end portions, a corrugated spring adapted to be received in the peripheral groove, and within said piston ring, said corrugated spring having corrugations contacting said side sections and arcuate end sections of said piston ring, the corrugations which contact said wall sections being closer together than the corrugations which contact said arcuate end sections.

4. The device set forth in claim 3 in which said wider spaced corrugations near said arcuate end sections each have four contact points, two of which contact an arcuate end section of said piston ring and the other two each contact a joinder region between a wall section and an arcuate end section.

* * * * *